United States Patent [19]

Naito et al.

[11] Patent Number: 4,828,059
[45] Date of Patent: May 9, 1989

[54] WALL-CRAWLING MACHINE

[75] Inventors: Shinji Naito, Hitachi; Kenji Tsuchita; Yoshiaki Ichikawa, both of Hitachiota; Chikara Sato; Shigeru Kajiyama, both of Hitachi, all of Japan

[73] Assignee: Babcock-Hitachi Kabushiki Kaisha, Tokyo, Japan

[21] Appl. No.: 104,269

[22] Filed: Oct. 5, 1987

[30] Foreign Application Priority Data

Oct. 3, 1986 [JP] Japan ................ 61-234662

[51] Int. Cl.4 ............................................. B62D 55/08
[52] U.S. Cl. .................................. 180/119; 180/9.52; 180/901; 305/36
[58] Field of Search ............... 180/119, 117, 116, 120, 180/901, 9.5, 9.52, 9, 9.1; 114/222; 305/36, 35 EB

[56] References Cited

U.S. PATENT DOCUMENTS 3,493,070 2/1970 Bertin ................................ 180/119
4,132,279 1/1979 Van der Lende ................. 180/901

FOREIGN PATENT DOCUMENTS 583358 8/1933 Fed. Rep. of Germany ..... 180/9.52
2032231 12/1971 Fed. Rep. of Germany ...... 180/901
6189184 5/1984 Japan .
200070 9/1986 Japan ................................. 180/119
8502135 5/1985 World Int. Prop. O. .......... 114/222

Primary Examiner—Charles A. Marmor
Assistant Examiner—Everett G. Diederiks, Jr.
Attorney, Agent, or Firm—Antonelli, Terry & Wands

[57] ABSTRACT

A wall-crawling machine comprises a body, a plurality of guide wheels rotatably mounted on the body, at least one crawler track extending around the guide wheels, a plurality of permanent magnets disposed on an outer surface of each of the crawler tracks, and a guide device provided on the respective crawler tracks for selectively restraining or releasing the crawler track from moving relative to the body in a direction perpendicular to a plane on which the permanent magnets travel.

6 Claims, 7 Drawing Sheets

WALL-CRAWLING MACHINE

FIELD OF THE INVENTION AND RELATED ART STATEMENT

This invention relates to a wall-crawling machine which is to be attached to a wall or ceiling by means of permanent magnets provided in crawler tracks and can be moved by driving such crawler tracks and, more particularly, to a wall-crawling machine in which a load dispersion mechanism is provided for selectively being attached to or detached from a wall surface.

A track vehicle which travels with crawling on a wall is known. An example of this type of vehicle is disclosed in Japanese Patent Laid-Open Publication No. 14095/1973, in which a crawler track (endless track) incorporates magnets for providing a magnetic attraction force between the crawler track and a wall to be travelled by such vehicle. The wall-crawling machine in which a plurality of attraction devices are disposed on outer surfaces of crawler tracks extending around guide wheels can not crawl fully on a ceiling, since the load (including the weight of the machine) applied to the machine is borne by the attraction devices that are located at opposite ends of each of the crawler tracks.

An example of the construction of a wallcrawling machine, which can readily exhibit an attraction ability sufficient for the operation of crawling on and traveling along a wall, is disclosed in Japanese Patent Laid-Open Publication No. 89184/1986. Such wall-crawling machine comprises a plurality of attraction devices provided on the outer surfaces of the crawler tracks extending around guide wheels rotatably mounted on a main body, and crawler track guide devices for restricting the movement of each crawler track relative to the main body in a direction perpendicular to a wall, so that the load (including the weight of the machine) is dispersed into all of the attraction devices in contact with the wall.

However, in the above conventional arts, if the attraction devices such as permanent magnets, whose attraction forces cannot be controlled, are used, it is impossible to attach the wall-crawling machine to a wall or detach it from the wall in a remote-controlled manner by a command from an operator or an automatic control unit. Therefore, this wall-crawling machine cannot transfer from a plane to another plane, such as from a vertical wall surface to a horizontal ceiling, or perform a transverse-walking operation such as that in which it laterally travels across a wall a small distance while removing its main body away from the wall. This type of wall-crawling machine has a sufficient attraction ability for traveling and operating on a leveled surface, but it cannot be removed from the flat surface to which it was attached when it started to operate. The operating range of this machine is thus greatly restricted.

SUMMARY OF THE INVENTION

It is therefore an object of the present invention to provide a wall-crawling machine which is capable of transferring from one wall surface to another wall surface and of partially moving above a wall surface by being freely detached from the wall surface in a remote-controlled manner, and which thus has an increased operating range.

To this end, the present invention is a wall-crawling machine having a crawler track guide device which is adapted to restrict the movement of a crawler track relative to a main body in a direction perpendicular to the wall surface, and which can move so as to restrict or release the crawler track as desired.

According to a preferable embodiment of the invention, a wall-crawling machine includes an actuator connecting the crawler track guide device to the main body of the machine, which is to be driven in response to a command from an operator on the ground or an automatic control unit.

If the relative movement of the crawler track to the main body in the direction perpendicular to the wall surface is restricted by the crawler track guide device, the crawler track can be considered to be a substantially rigid body with respect to the direction perpendicular to the wall surface. Therefore, the downwards load is transmitte from the main body of the wall-crawling machine through the crawler track guide device to an entire part of the crawler track dispersedly, which is in contact with the wall surface when the machine is attached to the ceiling. As a result, the load acts dispersely on all of the permanent magnets which are in contact with the wall surface and some of permanent magnets attached to the crawler track, so that the load which acts on each of the magnets is small. Let assume that the load including the weight of the machine is W, the number of permanent magnets in contact with the wall surface is n in each of the rows of crawler tracks which are provided on the outer surfaces thereof with such permanent magnets, and the number of such rows of crawler tracks provided is m, the load t applied to each magnet is expressed by Equation (1):

$$t = \frac{W}{m \cdot n} \quad (1)$$

If each of the magnets has an attraction force f as expressed by Equation (2), this wall-crawling machine will not fall.

$$f > t = \frac{W}{m \cdot n} \quad (2)$$

If both sides of Equation (2) are multiplied by m·n, the total attraction force F of the wall-crawling machine which prevents the machine from falling when the load W (including the weight of the machine) acts on the machine is given as follows:

$$F = m \cdot n \cdot f > W \quad (3)$$

As is clear from Equation (3), the attraction force F is in proportion to the product of the attraction force f of each magnet and the number of magnets m·n. It is therefore possible to realize a wall-crawling machine having a large attraction ability by setting the value of f or m·n to be as large as desired.

If the crawler track guide device is subsequently operated so as to release the crawler tracks which have been restrained, the crawler tracks can no longer be considered to be a rigid body, and the loads applied to the crawler tracks in this perpendicular direction are not transmitted to adjacent areas. Therefore, the load transmitted from the guide wheels to the crawler tracks is concentrated only on the magnets which are attached to the wall surface at opposite ends of each crawler. In the wall-crawling machine having a performance represented by Equations (1) to (3), the load is concentrated on 2m magnets, so that the minimum force $F'_{min}$ needed to detach the machine from the wall surface is given by Equation (4):

$$F'_{min} = 2\,mf = 2\frac{W}{n} \tag{4}$$

That is, when the crawler tracks are not restrained by the crawler track guide device, it is possible to detach the wall-crawling machine from the wall surface by applying a load 2/n times the load applied when the crawler tracks are restrained.

Other objects, the advantages and the function of the invention will be apparent from the following description of the preferred embodiments and the accompanying drawings.

DESCRIPTION OF THE PREFERRED EMBODIMENTS

Figure 1:
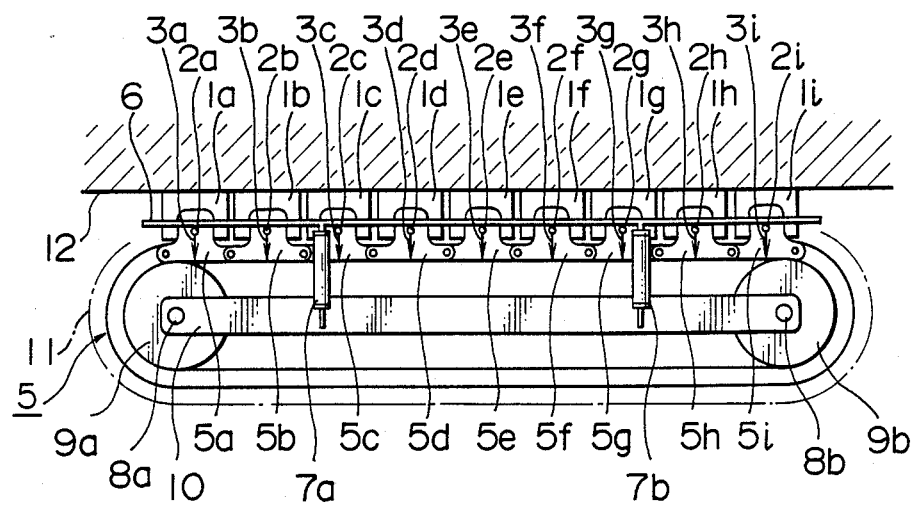
FIGS. 1 and 2 are illustrations of an embodiment of the present invention.
Figure 2:
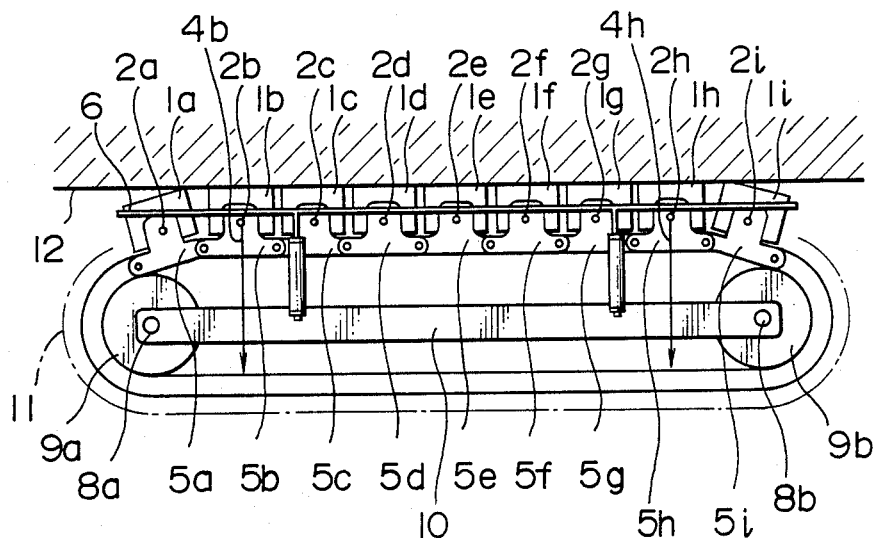

Referring to FIGS. 1 and 2, illustrated is a wall-crawling machine according to an embodiment of the present invention which is attracted upside down to a ceiling. The wall-crawling machine has a main body frame 10, guide wheels 9a and 9b, chain links 5a, —, 5i, —, permanent magnets 1a, —, 1i, —, and a guide device 6. The guide wheels 9a and 9b are rotatably mounted on opposite ends of the main body frame 10 through shafts 8a and 8b. An endless chain 5 constituted by the chain links 5a, —, 5i, — extends around the guide wheels 9a and 9b so that the machine can travel on a wall surface 12 when one of the guide wheels is driven by an actuator. The permanent magnets 1a, —, 1i, — are attached to the respective chain links 5a, —, 5i, — by means of pins 2a, —, 2i, —. The permanent magnets are provided along a whole of the chain 5. However, since the permanent magnets which are not in contact with the wall surface 12 have no meanings in terms of mechanics, they are omitted in the drawings but the locus exhibited by the pins is represented by a center line 11. The guide device 6 for guiding the crawler track is supported through air cylinders 7a and 7b on the main body frame 10. When, as shown in FIG. 1, the guide device 6 is driven by the air cylinders 7a and 7b so as to be brought closer to the main body frame 10, the pins 2a to 2i are forced by the guide device 6 towards the main body frame 10. The load (including the weight of the machine) is transmitted via the guide device 6 to all of the pins 2a to 2i, and then to the permanent magnets 1a to 1i connected to the pins 2a to 2i. The arrows 3a to 3i in FIG. 1 indicate the loads which are applied to the permanent magnets 1a to 1i, respectively. That is, the movement of the chain 5 or the crawler belt in a direction perpendicular to the wall surface is restrained, so that the load is dispersed to all of the permanent magnets 1a to 1i which are in contact with the wall surface.

The load which is applied to each of the magnets in this state is equal to the value indicated by Equation (1).

To the contrary, if as shown in FIG. 2, the guide device 6 is subsequently driven by the air cylinders 7a and 7b so as to move away from the main body frame 10, the pins 2a to 2i become freely movable relative to the guide device 6. At this time, the load on the main frame 10 is transmitted through the guide wheels 9a and 9b to the chain 5. If, at this time, a relative displacement occurs between adjacent chain links, a force occurs between these adjacent chain links. Conversely, if there is no relative displacement between adjacent chain links as shown in FIG. 2, no force is generated between these adjacent chain links, so that the load is not transmitted from the opposite end chain links 5b and 5h to the intermediate chain links 5c to 5g, but concentrated on the end chain links 5b and 5h. That is, the crawler track or the chain is made freely movable in the direction perpendicular to the wall surface, so that the load is concentrated on the opposite end permanent magnets in contact with the wall surface, thereby enabling the wall-crawling machine to be detached from the wall surface by such a small degree of force as given by Equation (4).

Figure 3:
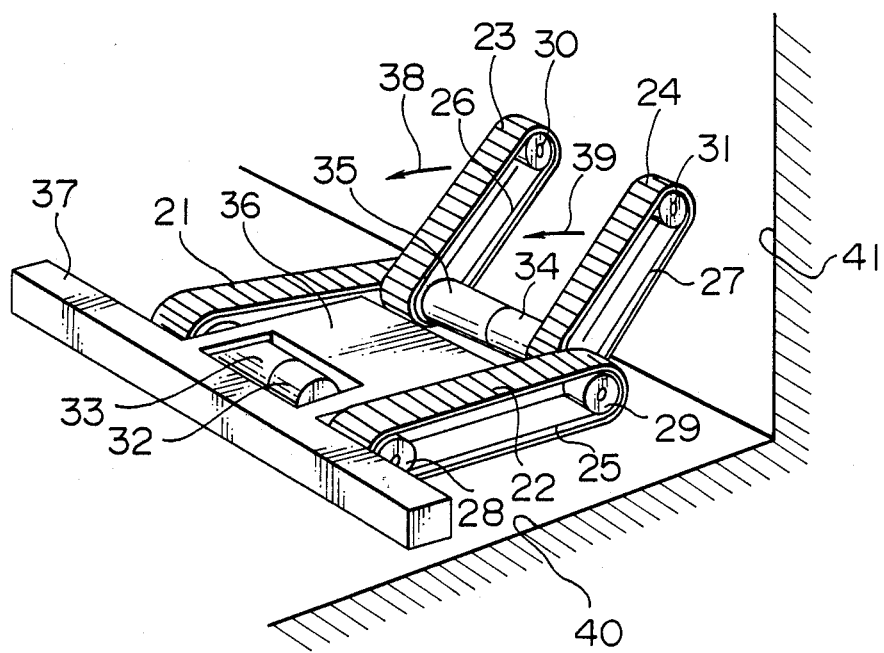
FIGS. 3, 5, and 7 are perspective views of other embodiments of the present invention, respectively.
Figure 4A:
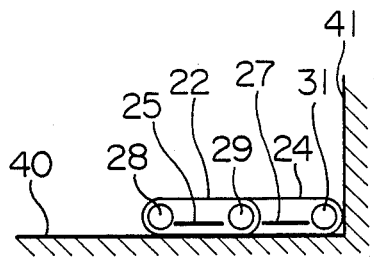
FIGS. 4A to 4F and 6A to 6F are side views of the embodiments shown in FIGS. 3 and 5 in the operation status, respectively.
Figure 4B:
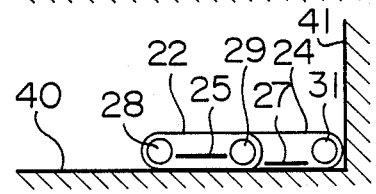
Figure 4C:
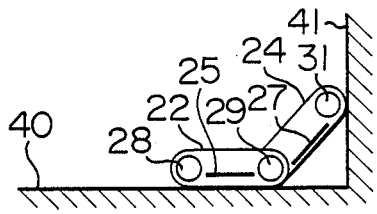
Figure 4D:
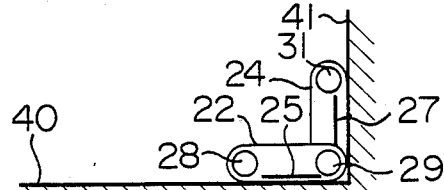
Figure 4E:
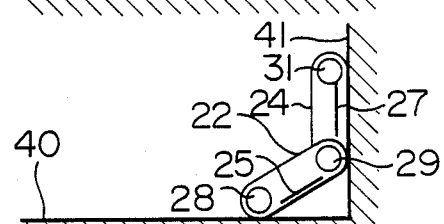
Figure 4F:
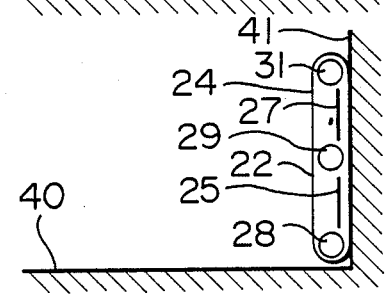

FIG. 3 shows a wall-crawling machine according to another embodiment of the present invention, which is capable of transferring from one wall surface to another wall surface. This machine has crawler tracks 21 to 24 each of which has permanent magnets disposed on its outer periphery and which can be independently attached to or detached from the wall surface by means of operating crawler track guide devices 25 to 27 and of driving mechanisms for driving the guide mechanisms. When a traveling motor 32 is driven, guide wheels 28 to 31 are rotated by the driving force of the motor 32 through a reduction gear 33, thereby rotating the crawler tracks 21 to 24. When a turning motor 34 is driven, the driving force of the turning motor acts through a reduction gear 35 to raise the crawler tracks 23 and 24 relative to the crawler tracks 21 and 22 in the direction indicated by the arrows 38 and 39. The crawler tracks 21 and 22 are tiltably attached to a main body 36 to which an inspecting device 37 is fixed.

FIGS. 4A to 4F show a sequence of operations of the machine shown in FIG. 3 which transfers from one plane to another plane. In the first step (FIG. 4A), both crawler tracks 22 and 24 (or, 21 and 23) on each side of the machine are attached to a wall surface 40. In the second step (FIG. 4B), a guide device 27 for the crawler track 24 is released, and, in the third step (FIG. 4C) the crawler track 24 is removed from the wall surface 40. In the fourth step (FIG. 4D), the guide device 27 is operated to be returned to the restrained state and the crawler track 24 is made to attach to a wall surface 41. Next, a guide device 25 for the crawler track 22 is released, and, in the fifth step (FIG. 4E), the crawler track 22 is removed from the wall surface 40. Finally, in the final step (FIG. 4F), the crawler track 22 is made to attach to the wall surface 41 after the guide device 25 has been operated to be returned to the restricted state. The operation of transferring the machine is thus completed. In accordance with this embodiment, the machine can continue to travel by transferring over different planes, and the traveling range of the machine is not limited within one plane so that the machine can work in an increased operating range.

Figure 5:
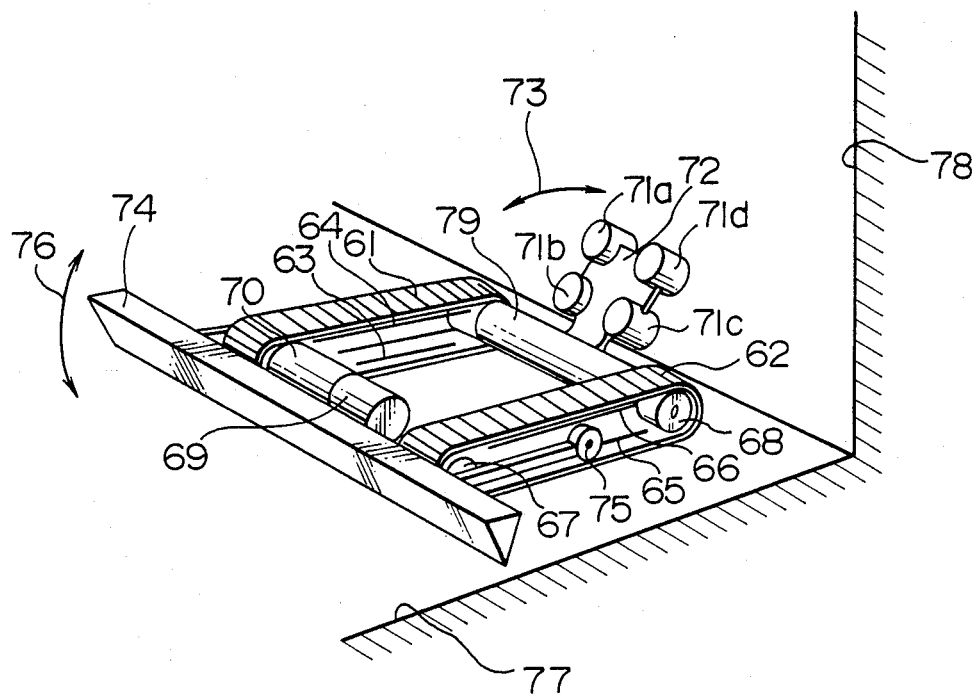
Figure 6:
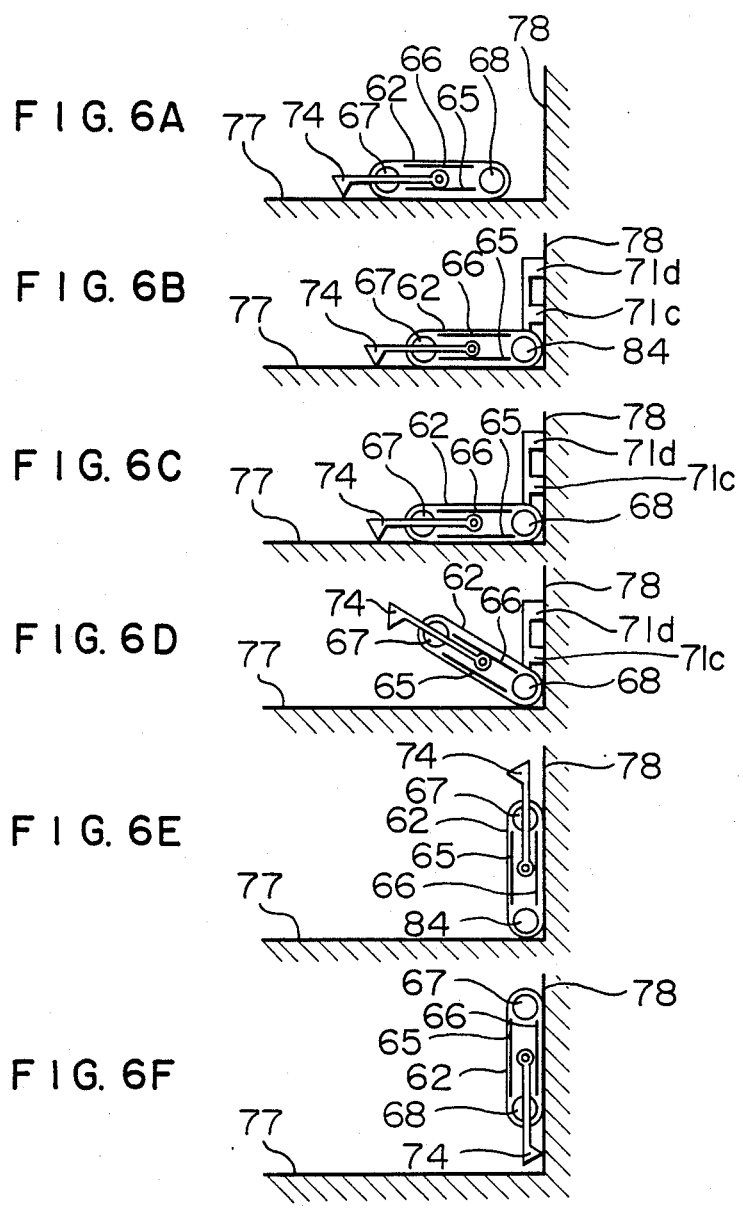

FIG. 5 shows a wall-crawling machine according to still another embodiment of the present invention, which is also capable of transferring over different planes. In this embodiment, crawler tracks 61 and 62 each of which has permanent magnets disposed on an outer periphery thereof can be independently attached to or detached from a wall surface 77 or 78 by means of the operation of guide devices 63 to 66 for the crawler tracks and of driving mechanisms for the guide devices. When a traveling motor 69 is driven, guide wheels 67 and 68 are rotated by the driving force from the motor 69 through a reduction gear 70, thereby rotating the crawler tracks 61 and 62. The main body of the machine accommodates permanent magnets 71a to 71d which have reverse-excitation releasing functions and which are attached to an arm 72. The arm 72 is swung by a driving mechanism 79 in directions indicated by the arrow 73. An inspecting device 74 is disposed at one end of the machine and is pivoted on axes of shafts 75 by a driving mechanism in directions indicated by the arrow 76.

FIGS. 6A to 6F show a sequence of operations of the machine shown in FIG. 5 which transfers from one plane to another plane. In the first step (FIG. 6A), a crawler track 62 (or 61) on each side of the machine is attracted to a wall surface 77. In the second step (FIG. 6B), permanent magnets 71a to 71d each having reverse-excitation releasing functions are made to be attached to a wall surface 78. In the third step (FIG. 6C), a guide device 65 for the crawler track 62 is released and a guide device 66 for the crawler track 62 is set in the restrained state. In the fourth step (FIG. 6D), the crawler track 62 is lifted from the wall surface 77 while the machine is being supported by the permanent magnets 71a to 71d on the wall surface 78. In the fifth step (FIG. 6E), the permanent magnets 71a to 71d are released to be removed from the wall surface 78 after the crawler track 62 has attracted to the wall surface 78. Finally, in the final step (FIG. 6F), the inspecting device 74 is reversed, thereby completing the transferring operation. In accordance with this embodiment, the traveling range of the machine is not limited within one plane so that the machine can work in an increased operating range. In addition, the upper and lower parts of the crawler track can be effectively utilized for the attraction operation, thereby making it possible to reduce being capable of reducing the number of crawler tracks and, hence, the size and weight of the machine.

Figure 7:
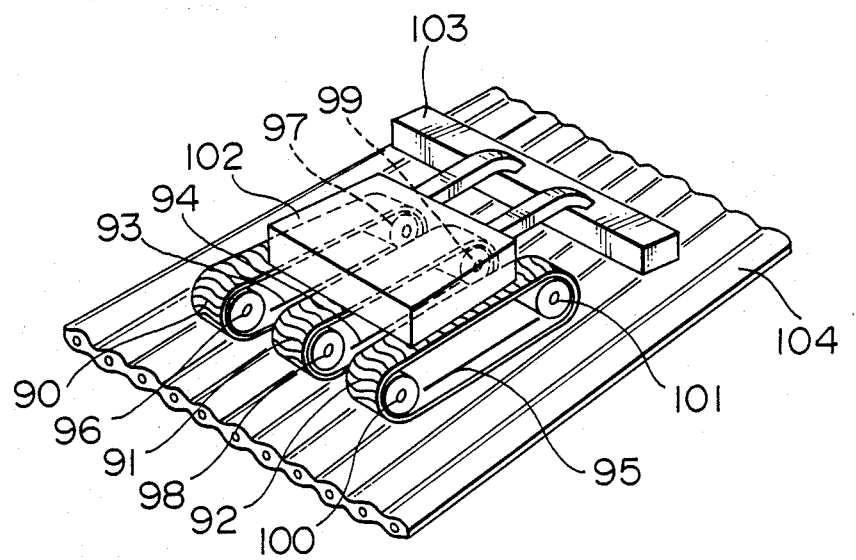

FIG. 7 shows a wall-crawling machine according to a further embodiment of the present invention, which can perform a transverse-walking operation on a wall surface. Such wall surface 104 has a corrugated surface similar to that of a water tube wall of a boiler. While the crawler tracks are in close contact with such wall surface, it is impossible to steer the crawler tracks of machine. In order to travel transversely, in this case, it is necessary for the machine to move the crawler tracks transversely with lifting the crawler tracks from the wall surface. The crawler tracks 90 to 92 each of which has permanent magnets disposed on its outer periphery can be independently attached t or detached from the wall surface by guide devices 93 to 95 for the crawler tracks and by driving mechanisms for the guide devices 93 to 95. The crawler tracks 90 to 92 can be moved vertically away from or close to a main body 102 and can change the distances among them. An inspecting device 103 is attached to the main body 102.

Figure 8A:
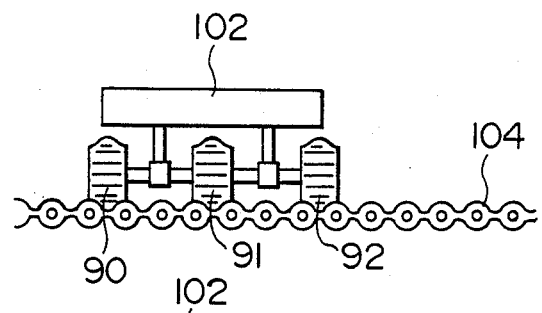
FIGS. 8A to 8D are front views of the embodiment shown in FIG. 7 in the operation status.
Figure 8B:
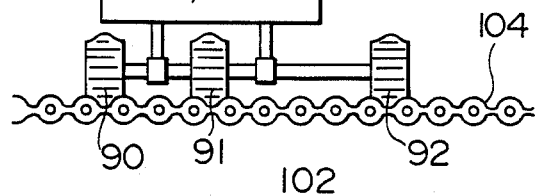
Figure 8C:
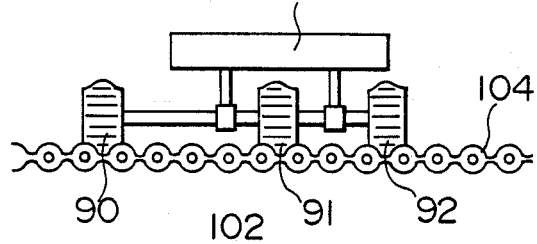
Figure 8D:
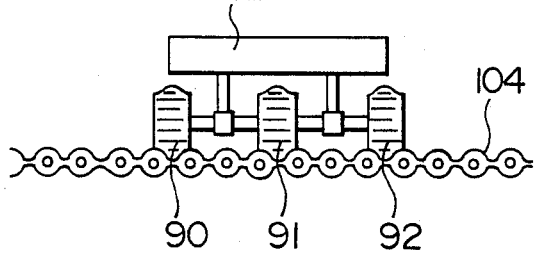

FIGS. 8A to 8D schematically show the states in which the wall-crawling machine in accordance with this embodiment traverses on a corrugated wall surface. FIG. 8A shows a front view of the machine when stopped after traveling. In the first state (FIG. 8B), the crawler track 92 is removed upwards away from the wall surface 104 and then moved laterally. In the second state (FIG. 8C), the crawler track 91 is subsequently removed upwards away from the wall surface 104 and then also moved laterally. In the third state (FIG. 8D), the crawler track 90 is also removed upwards away from the wall surface 104 and then moved laterally, thereby completing a transverse-walking operation. A crawling machine in accordance with this embodiment can perform a transverse-walking operation by means of successively removing the crawler tracks away from the wall surface by the guide devices and of moving them transversely. Therefore it is possible for this vehicle to move to a desired point even on a wall surface which makes it difficult or impossible to steer the machine. The present invention may be applied to a type of conveyor system, that is, a system in which crawlers are used as belt conveyors, and magnetic-substance articles are conveyed by being hung under the conveyors. In this case, a crawler track guide plate is released at a desired position so as to let the article fall. However, in this case, it is necessary to convey the articles one by one.

According to the present invention, even a type of wall-crawling machine having the attraction devices, whose attraction ability cannot be controlled, can change the total attraction ability of the machine by operating the guide devices for the crawler tracks. Therefore, while the machine ordinarily exhibits an attraction ability sufficient for its attracted-traveling and working operations, the crawler tracks can be detached from the wall surface only by a small force by operating the guide devices for the crawler tracks as desired.

The present invention realizes a wallcrawling machine which can be easily attached to or detached from the wall surface and which can transfer itself over different planes. This machine may be used to inspect or repair a structure, such as an oil tank or a ship constituted by a plurality of planes, which is not accessible for man, by traveling itself over the almost entire part of the wall surfaces of the structure.

The present invention also provides a crawling vehicle which can perform a transverse-walking operation as desired, thereby making it possible to inspect or repair, for example, a water tube wall of a thermal power plant boiler along which it is not possible to steer the vehicle in the ordinary manner.

What is claimed is:
1. A wall-crawling machine comprising:
a body;
a plurality of guide wheels rotatably mounted on said body;
at least one crawler track extending around said guide wheels;
a plurality of permanent magnets secured to an outer surface of each of said crawler tracks, each of said permanent magnets including a connecting member; and
guide means associated with the respective crawler tracks and means for selectively moving said guide means between first and second positions for, in said first position, engaging a plurality of said connecting members to combine; some of said permanent magnets, which face a plane on which said permanent magnets travel, into an integrated mag- net means against a force acting on said integrated magnet means in a direction perpendicular to said plane and in said second position, said connecting members being freely movable relative to said guide means for separating said integrated magnet means into permanent magnets which individually act in a direction perpendicular to said plane.

2. A wall-crawling machine according to claim 1, wherein said crawler track comprising a plurality of links each of which carries a permanent magnet through its associated connecting member, and wherein said means for selectively moving said guide means includes at least one fluidic cylinder connected at one end thereof to said body, and wherein said guide means includes a rigid bar to which said fluidic cylinder is connected at the other end thereof, so that said rigid bar is capable of engaging with said connecting members to combine some of said permanent magnets, which face a plane on which said permanent magnets travel, into said integrated magnet means against a force acting on the integrated magnet means in a direction perpendicular to said plane.

3. A wall-crawling machine according to claim 1, wherein a plurality of pairs of crawler tracks are provided, one of each of said pairs is swingable relative to the other.

4. A wall-crawling machine according to claim 1, wherein said machine further comprises supporting means which is magnetically energized or de-energized, and driving means for making said crawler track swing about a swing axis, and wherein said guide means includes a first guide means provided along a first part of said crawler track and a second guide means provided along a part of said crawler track opposite to said first part of said crawler track.

5. A wall-crawling machine according to claim 1, wherein a plurality of crawler tracks are provided parallel to each other, and wherein each of said crawler tracks is movable close to and apart from the adjacent one in a direction perpendicular to a traveling direction of said machine.

6. A wall-crawling machine according to claim 1, wherein said machine further comprises inspecting means for inspecting a condition of a part of said plane around said machine.

* * * * *